United States Patent
Omura et al.

(10) Patent No.: US 11,340,407 B2
(45) Date of Patent: May 24, 2022

(54) METHOD FOR MANUFACTURING OPTICAL CONNECTOR FERRULE AND OPTICAL CONNECTOR FERRULE

(71) Applicant: SUMITOMO ELECTRIC INDUSTRIES, LTD., Osaka (JP)

(72) Inventors: Masaki Omura, Osaka (JP); Fumiya Uehara, Osaka (JP); Yusuke Takai, Komaki (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/057,015

(22) PCT Filed: Jan. 30, 2019

(86) PCT No.: PCT/JP2019/003249
§ 371 (c)(1),
(2) Date: Nov. 19, 2020

(87) PCT Pub. No.: WO2019/234968
PCT Pub. Date: Dec. 12, 2019

(65) Prior Publication Data
US 2021/0109296 A1    Apr. 15, 2021

(30) Foreign Application Priority Data
Jun. 5, 2018    (JP) .............................. JP2018-107746

(51) Int. Cl.
*G02B 6/38*     (2006.01)
*B29C 45/14*    (2006.01)
(Continued)

(52) U.S. Cl.
CPC ...... *G02B 6/3839* (2013.01); *B29C 45/14065* (2013.01); *G02B 6/3854* (2013.01);
(Continued)

(58) Field of Classification Search
CPC .......................... G02B 6/3644; G02B 6/3839
See application file for complete search history.

(56) References Cited

U.S. PATENT DOCUMENTS

2002/0076168 A1*  6/2002  Suematsu ............ G02B 6/3865
                                                    385/80
2003/0002802 A1*  1/2003  Trezza .................... G02B 6/38
                                                    385/53
(Continued)

FOREIGN PATENT DOCUMENTS

JP    2002-148484 A    5/2002
JP    2003-287652 A   10/2003
(Continued)

OTHER PUBLICATIONS

Apr. 9, 2019 International Search Report issued in International Patent Application No. PCT/JP2019/003249.

*Primary Examiner* — Charlie Y Peng
(74) *Attorney, Agent, or Firm* — Oliff PLC

(57) ABSTRACT

Optical fiber hole forming pins configured to form optical fiber holding holes each have a first portion located adjacent to a first end surface and a second portion located adjacent to a second end surface and larger in diameter than the first portion. At least one of the plurality of optical fiber hole forming pins is different from the other optical fiber hole forming pins in position, in a first direction, of a step portion located at a boundary between the first portion configured to form a small diameter portion of each of the optical fiber holding holes and the second portion configured to form a large diameter portion of each of the optical fiber holding holes.

6 Claims, 18 Drawing Sheets

(51) Int. Cl.
*B29K 81/00* (2006.01)
*B29L 11/00* (2006.01)

(52) U.S. Cl.
CPC ........ *G02B 6/3882* (2013.01); *B29K 2081/04* (2013.01); *B29L 2011/0075* (2013.01)

(56) References Cited

U.S. PATENT DOCUMENTS

| | | | |
|---|---|---|---|
| 2004/0057671 A1* | 3/2004 | Kang | G02B 6/3885 385/71 |
| 2005/0123248 A1 | 6/2005 | Sakurai et al. | |
| 2006/0115217 A1* | 6/2006 | Childers | G02B 6/3885 385/53 |
| 2015/0247982 A1 | 9/2015 | Ohmura et al. | |

FOREIGN PATENT DOCUMENTS

| | | |
|---|---|---|
| JP | 2003-337262 A | 11/2003 |
| JP | 2005-041134 A | 2/2005 |
| JP | 2008-282055 A | 11/2008 |
| JP | 2015-179267 A | 10/2015 |
| KR | 20030012941 A | 2/2003 |

\* cited by examiner

METHOD FOR MANUFACTURING OPTICAL CONNECTOR FERRULE AND OPTICAL CONNECTOR FERRULE

TECHNICAL FIELD

One aspect of the present disclosure relates to a method for manufacturing an optical connector ferrule and an optical connector ferrule.

This application claims the priority based on Japanese Patent Application No. 2018-107746 filed on Jun. 5, 2018, which is hereby incorporated by reference in its entirety.

BACKGROUND ART

Various types of optical connector ferrules and methods for manufacturing the optical connector ferrules are known heretofore. Patent Literature 1 discloses an optical connector ferrule. The optical connector ferrule has a front end, a rear end, an upper surface, and a lower surface. The upper surface extends along an XY plane, and the front end extends along an YZ plane. The optical connector ferrule has two guide holes into which guide pins are inserted, and a plurality of optical fiber holes arranged between the two guide holes. Each of the fiber holes has a large diameter portion located adjacent to the rear end and a small diameter portion located adjacent to the front end, and a plurality of fiber grooves are provided at rear ends of the fiber holes.

The optical connector ferrule is manufactured by resin molding using a mold. The mold includes an upper mold and a lower mold that define a cavity, and a middle mold placed in the cavity. The middle mold has two guide hole pins configured to form the guide holes of the optical connector ferrule and a plurality of fiber hole pins configured to form the fiber holes of the optical connector ferrule.

The plurality of fiber holes have a row of first fiber holes arranged in the Y direction adjacent to the upper surface and a row of second fiber holes arranged in the Y direction adjacent to the lower surface. The large diameter portion of each fiber hole in the row of second fiber holes is longer than the large diameter portion of each fiber hole in the row of first fiber holes. On the other hand, the plurality of fiber hole pins of the mold have a row of first pins configured to form the row of first fiber holes and a row of second pins configured to form the row of second fiber holes. Both the row of first pins and the row of second pins have small diameter portions and large diameter portions. The row of first pins is larger than the row of second pins in length of a portion of the large diameter portion of each fiber hole pin that projects forward. Therefore, the large diameter portions of the second fiber holes formed by the row of second pins extend longer than the large diameter portions of the first fiber holes formed by the row of first pins.

CITATION LIST

Patent Literature

Patent Literature 1: Japanese Unexamined Patent Publication No. 2015-179267

SUMMARY OF INVENTION

A method for manufacturing an optical connector ferrule according to an embodiment is a method for manufacturing an optical connector ferrule made of resin, the method including introducing resin into a cavity of a mold, the cavity taking a shape of the optical connector ferrule, and hardening the resin to form the optical connector ferrule. The optical connector ferrule includes a first end surface and a second end surface facing each other in a first direction, a pair of side surfaces facing each other in a second direction intersecting the first direction, an upper surface and a lower surface facing each other in a third direction intersecting both the first direction and the second direction, an inlet port formed on the second end surface, the inlet port being configured to collectively introduce a plurality of optical fibers along the first direction, a window hole communicating from the upper surface to the inlet port, a plurality of optical fiber holding holes extending through from the inlet port to the first end surface along the first direction and arranged side by side along the second direction, each of the plurality of optical fiber holding holes having a small diameter portion located adjacent to the first end surface and a large diameter portion located adjacent to the second end surface and larger in diameter than the small diameter portion, each of the plurality of optical fiber holding holes being configured to hold a corresponding one of the plurality of optical fibers, and a plurality of fiber grooves each extending from a corresponding one of a plurality of the large diameter portions along the first direction and facing an opening of the window hole along the third direction. At least one of a plurality of mold pins configured to form the plurality of optical fiber holding holes is different from the other mold pins in position, in the first direction, of a step portion located at a boundary between a first portion configured to form the small diameter portion and a second portion configured to form the large diameter portion.

An optical connector ferrule according to an embodiment is an optical connector ferrule made of resin. The optical connector ferrule includes a first end surface and a second end surface facing each other in a first direction, a pair of side surfaces facing each other in a second direction intersecting the first direction, an upper surface and a lower surface facing each other in a third direction intersecting both the first direction and the second direction, an inlet port formed on the second end surface, the inlet port being configured to collectively introduce a plurality of optical fibers along the first direction, a window hole communicating from the upper surface to the inlet port, a plurality of optical fiber holding holes extending through from the inlet port to the first end surface along the first direction and arranged side by side along the second direction, each of the plurality of optical fiber holding holes having a small diameter portion located adjacent to the first end surface and a large diameter portion located adjacent to the second end surface and larger in diameter than the small diameter portion, each of the plurality of optical fiber holding holes being configured to hold a corresponding one of the plurality of optical fibers, and a plurality of fiber grooves each extending from a corresponding one of a plurality of the large diameter portions along the first direction and facing an opening of the window hole along the third direction. The small diameter portions become longer and longer in the first direction from both ends in the second direction toward a center.

DESCRIPTION OF EMBODIMENTS

Problem to Be Solved by Present Disclosure

Figure 14:
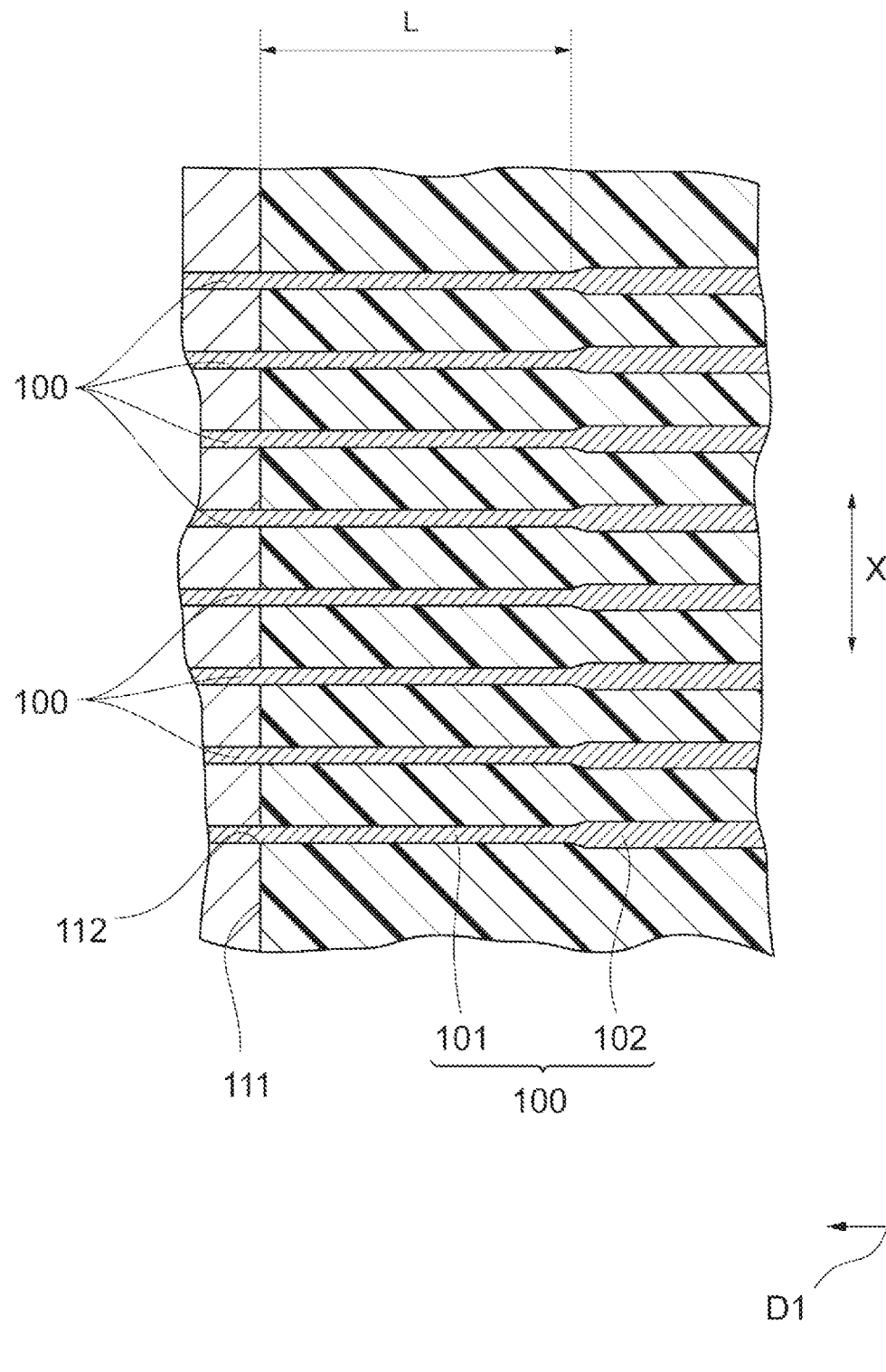
FIG. 14 is a diagram showing an optical connector ferrule and an arrangement of mold pins in the related art.

As described above, the positions of the optical fiber holding holes configured to hold the optical fibers are determined by a mold part including the mold pins. The positions of the optical fiber holding holes need to be aligned with accuracy of submicron order. However, for example, as shown in FIG. 14, when mold pins 100 each have a small diameter portion 101 and a large diameter portion 102, lengths L of the small diameter portions 101 along an X direction in which the mold pins 100 are arranged side by side are identical to each other.

Figure 15:
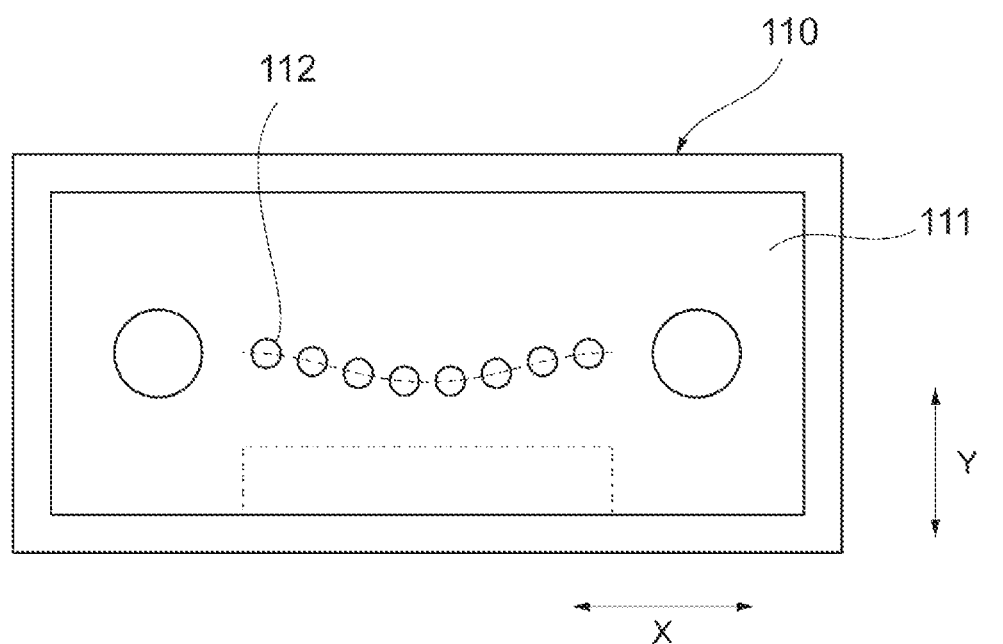
FIG. 15 is a diagram showing an end surface of an optical connector ferrule manufactured by using the mold pins shown in FIG. 14.
Figure 15:
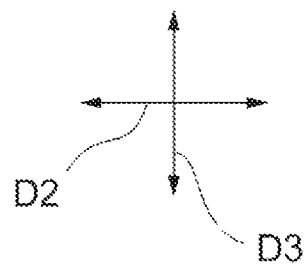

As described above, when the lengths L of the small diameter portions 101 are the same among all the mold pins 100 arranged side by side along the X direction, a phenomenon as shown in FIG. 15 may occur where the positions of optical fiber holding holes 112 on an end surface 111 of the optical connector ferrule 110 are misaligned in a curve shape in a Y direction that is a width direction of the end surface 111. That is, when the lengths L of the small diameter portions 101 are the same among all the mold pins 100, optical fiber holding holes 112 located adjacent to the center in the X direction are formed at positions misaligned in the Y direction relative to optical fiber holding holes 112 located adjacent to both the ends in the X direction. This is due to the flow (filling pressure, filling order) of resin used for molding, shrinkage of the resin, and the like. When the positions of the optical fiber holding holes 112 are misaligned in the Y direction as described above, it may be necessary to manufacture the optical connector ferrule from scratch. It is currently difficult to adjust the misalignment of the positions of the optical fiber holding holes 112 in the Y direction.

An aspect of the present disclosure is to provide a method for manufacturing an optical connector ferrule and an optical connector ferrule that allow adjustments to positions of optical fiber holding holes in a width direction of an end surface of the optical connector ferrule.

Advantageous Effects of Present Disclosure

According to the aspect of the present disclosure, the positions of the optical fiber holding holes in the width direction of the end surface of the optical connector ferrule can be adjusted.

DESCRIPTION OF EMBODIMENTS

First, descriptions will be given in series of the contents of embodiments of the present invention. A method for manufacturing an optical connector ferrule according to the embodiments is a method for manufacturing an optical connector ferrule made of resin, and the method includes introducing the resin into a cavity of a mold, the cavity taking a shape of the optical connector ferrule, and hardening the resin to form the optical connector ferrule. The optical connector ferrule includes a first end surface and a second end surface facing each other in a first direction, a pair of side surfaces facing each other in a second direction intersecting the first direction, and an upper surface and a lower surface facing each other in a third direction intersecting both the first direction and the second direction. The optical connector ferrule includes an inlet port formed on the second end surface, the inlet port being configured to collectively introduce a plurality of optical fibers along the first direction, and a window hole communicating from the upper surface to the inlet port. The optical connector ferrule includes a plurality of optical fiber holding holes extending through from the inlet port to the first end surface along the first direction and arranged side by side along the second direction, each of the plurality of optical fiber holding holes having a small diameter portion located adjacent to the first end surface and a large diameter portion located adjacent to the second end surface and larger in diameter than the small diameter portion, each of the plurality of optical fiber holding holes being configured to hold a corresponding one of the plurality of optical fibers, and a plurality of fiber grooves each extending from a corresponding one of a plurality of the large diameter portions along the first direction and facing an opening of the window hole along the third direction. At least one of a plurality of mold pins configured to form the plurality of optical fiber holding holes is different from the other mold pins in position, in the first direction, of a step portion located at a boundary between a first portion configured to form the small diameter portion and a second portion configured to form the large diameter portion.

Under the method for manufacturing an optical connector ferrule, resin is introduced into the cavity of the mold and then hardened, thereby manufacturing an optical fiber ferrule. The mold includes the plurality of mold pins configured to form the plurality of optical fiber holding holes, and at least one of the plurality of mold pins is different from the other mold pins in position of the step portion in the first direction. That is, the first portion that is the small diameter portion of at least one of the mold pins is different in length from the first portions of the other mold pins. Accordingly, making the lengths of the first portions different from each other among the plurality of mold pins allows adjustments to the positions of the optical fiber holding holes on the first end surface of the optical connector ferrule in the width direction (for example, the Y direction described above) of the first end surface.

Further, the mold may include a gate located adjacent to the second end surface in the first direction relative to the window hole, the gate being configured to introduce the resin into the cavity. In this case, since the gate of the mold is formed adjacent to the second end surface of the optical connector ferrule relative to the window hole, the position of the gate is located away from the first end surface where openings of the optical fiber holding holes are formed. Therefore, setting the position of the gate away from the first end surface allows more effective adjustments to the positions of the optical fiber holding holes in the width direction of the first end surface.

Further, the first portions of the mold pins may become longer and longer from both the ends in the second direction toward the center. In this case, since the first portions configured to form the small diameter portions become longer and longer toward the center in the second direction in which the optical fiber holding holes are arranged side by side, it is possible to suppress the misalignment of the optical fiber holding holes located adjacent to the center in the second direction. Therefore, it is possible to prevent a phenomenon where the positions of the optical fiber holding holes are curved in the width direction of the first end surface.

Further, the first portions of the mold pins may become shorter and shorter from both the ends in the second direction toward the center. This allows the positions of the optical fiber holding holes to be further curved in the width direction of the first end surface.

A diameter of the first portions of the mold pins may be in a range of from 80 µm to 128 µm, both inclusive. This allows more effective adjustments to the positions of the optical fiber holding holes in the width direction of the first end surface.

A diameter of the second portions of the mold pins may be in a range of from 100 µm to 250 µm, both inclusive. This allows more effective adjustments to the positions of the optical fiber holding holes in the width direction of the first end surface.

An optical connector ferrule according to the embodiments is an optical connector ferrule made of resin, the optical connector ferrule including a first end surface and a second end surface facing each other in a first direction, a pair of side surfaces facing each other in a second direction intersecting the first direction, and an upper surface and a lower surface facing each other in a third direction intersecting both the first direction and the second direction. The optical connector ferrule includes an inlet port formed on the second end surface, the inlet port being configured to collectively introduce a plurality of optical fibers along the first direction, and a window hole extending from the upper surface to the inlet port. The optical connector ferrule includes a plurality of optical fiber holding holes extending through from the inlet port to the first end surface along the first direction and arranged side by side along the second direction, each of the plurality of optical fiber holding holes having a small diameter portion located adjacent to the first end surface and a large diameter portion located adjacent to the second end surface and larger in diameter than the small diameter portion, each of the plurality of optical fiber holding holes being configured to hold a corresponding one of the plurality of optical fibers, and a plurality of fiber grooves each extending from a corresponding one of a plurality of the large diameter portions along the first direction and facing an opening of the window hole along the third direction. The small diameter portions in the first direction become longer and longer from both ends in the second direction toward a center.

This optical connector ferrule includes the first end surface, the second end surface, the pair of side surfaces, the upper surface, and the lower surface, and the inlet port through which the plurality of optical fibers are collectively introduced is formed on the second end surface. Further, the optical connector ferrule includes the window hole extending from the upper surface to the inlet port, and the optical fiber holding holes extending through along the first direction from the inlet port to the first end surface, and each of the optical fiber holding holes has the small diameter portion located adjacent to the first end surface and the large diameter portion located adjacent to the second end surface. The small diameter portions of the optical fiber holding holes become longer and longer in the first direction toward the center from both the ends in the second direction in which the optical fiber holding holes are arranged side by side. Accordingly, making the lengths of the small diameter portions of the optical fiber holding holes different from each other allows adjustments to the positions of the optical fiber holding holes in the width direction of the first end surface. Further, as the small diameter portions become longer and longer in the first direction from both the ends in the second direction toward the center, it is possible to suppress misalignment of the optical fiber holding holes located adjacent to the center in the second direction. Therefore, it is possible to prevent a phenomenon where the positions of the optical fiber holding holes are curved in the width direction of the first end surface.

Further, the above-described optical connector ferrule may include a gate mark formed adjacent to the second end surface in the first direction relative to the window hole. In this case, since the gate mark formed by a gate of a mold is provided adjacent to the second end surface of the optical connector ferrule relative to the window hole, the position of the gate mark is located away from the first end surface where the openings of the optical fiber holding holes are formed. Therefore, setting the position of the gate mark away from the first end surface allows more effective adjustments to the positions of the optical fiber holding holes in the width direction of the first end surface.

Details of Embodiments

Hereinafter, a description will be given of a specific example of a method for manufacturing an optical connector ferrule, and the optical connector ferrule according to the embodiment with reference to the drawings. It should be noted that the present invention is not limited to the following examples, and is intended to be defined by the claims and to include all modifications within the scope of the claims and their equivalents. Note that, in the following description, the same or equivalent components are denoted by the same reference numerals, and any redundant description will be omitted as appropriate. Further, the drawings may be simplified or exaggerated in part for ease of understanding, and dimensional ratios and the like are not limited to those described in the drawings.

First Embodiment

Figure 1:
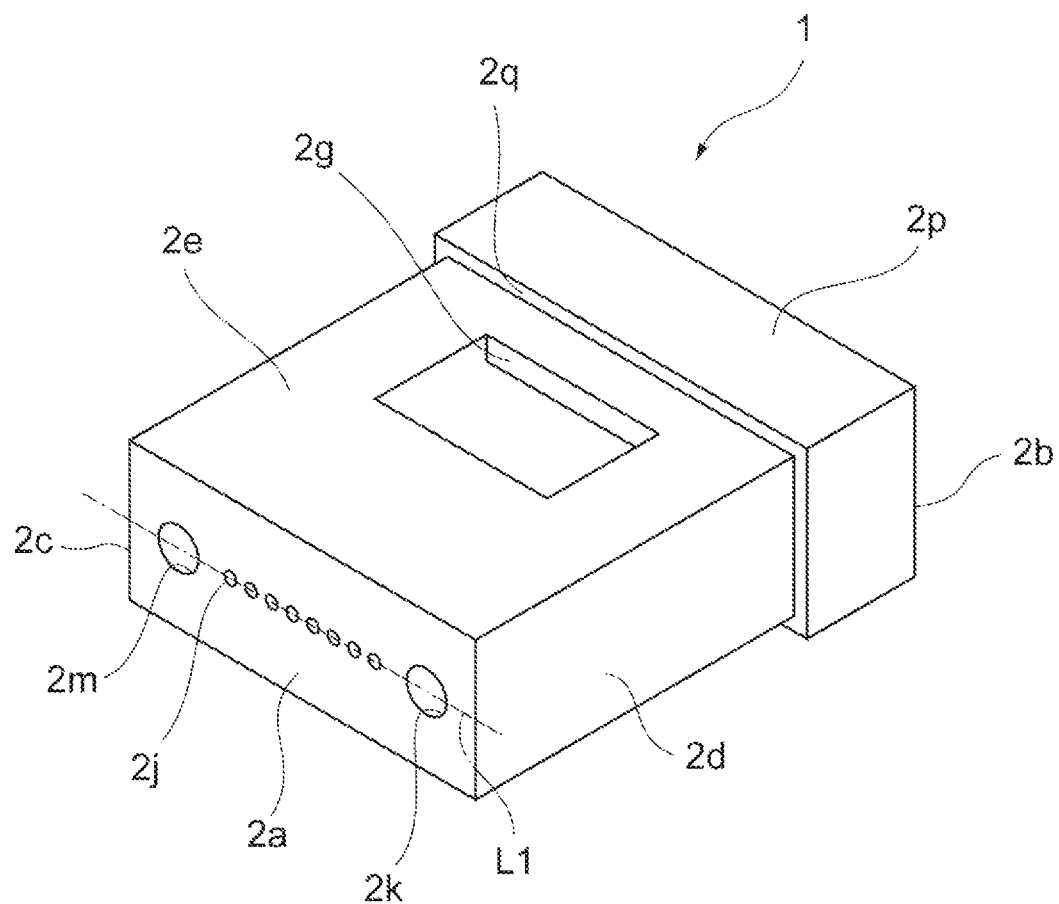
FIG. 1 is a perspective view of an optical connector ferrule according to a first embodiment.
Figure 1:
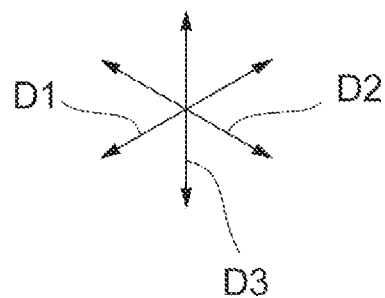
Figure 2:
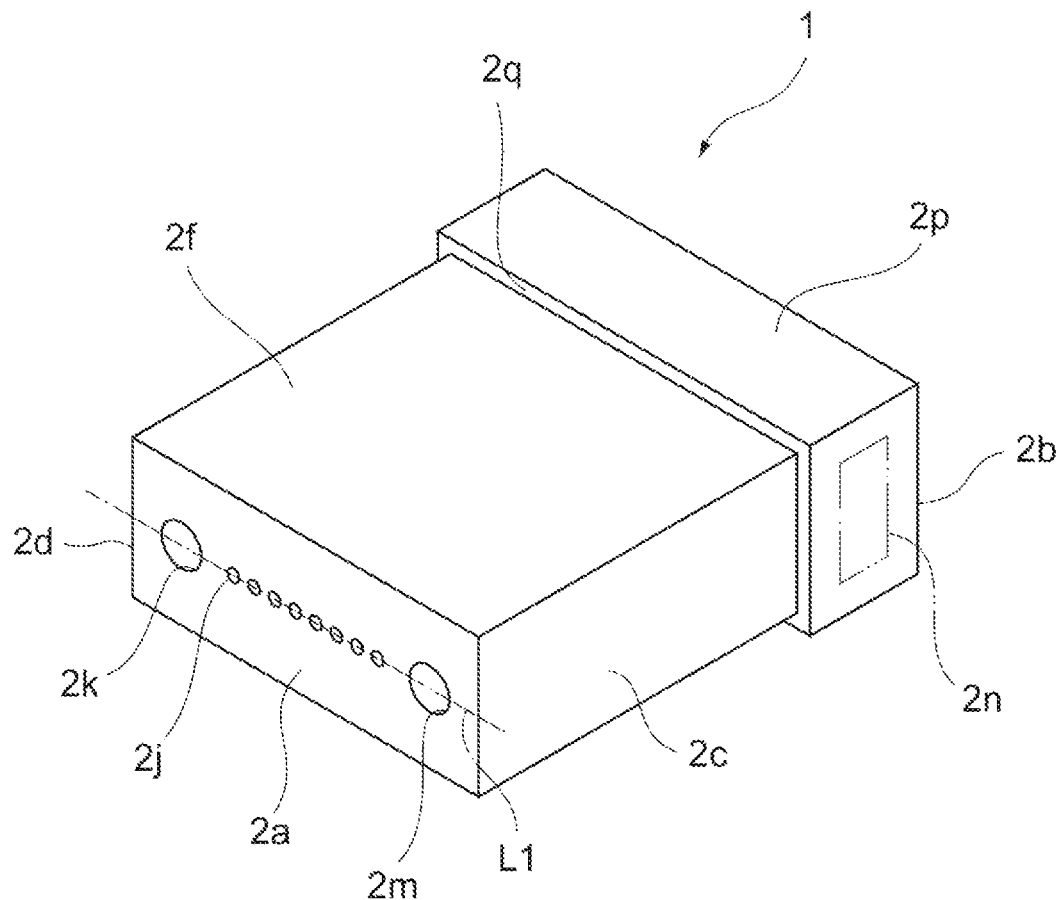
FIG. 2 is a perspective view of the optical connector ferrule shown in FIG. 1 as viewed from a direction different from the direction in FIG. 1.
Figure 2:
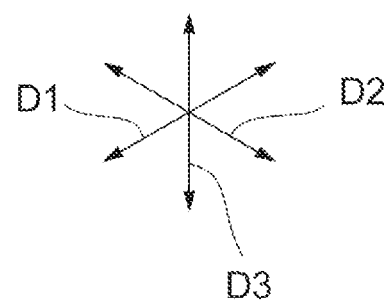

FIG. 1 is a perspective view of an optical connector ferrule 1 according to a first embodiment. FIG. 2 is a perspective view of the optical connector ferrule 1 as viewed from a direction different from the direction in FIG. 1. As shown in FIG. 1 and FIG. 2, the optical connector ferrule 1 has an approximate cuboid shape and is made of, for example, resin. The optical connector ferrule 1 is, for example, an MT ferrule.

The optical connector ferrule 1 has a first end surface 2a that is flat and is provided at one end of the optical connector ferrule 1 in a first direction D1 to face a mating connector, and a second end surface 2b provided at the other end in the first direction D1. The first direction D1 is a connection direction in which the mating connector and the optical connector ferrule 1 are connected to each other. Furthermore, the optical connector ferrule 1 has a pair of side surfaces 2c and 2d, an upper surface 2e, and a lower surface 2f extending in the first direction D1.

The first end surface 2a is, for example, a ferrule end surface that is rectangular and extends in a second direction D2 intersecting the first direction D1. Long sides of the first end surface 2a extend in the second direction D2, and short sides of the first end surface 2a extend in a third direction D3. The third direction D3 is a direction intersecting (for example, orthogonal to) both the first direction D1 and the second direction D2. The first direction D1, the second direction D2, and the third direction D3 may be referred to as a Z direction, an X direction, and a Y direction, respectively.

Figure 3:
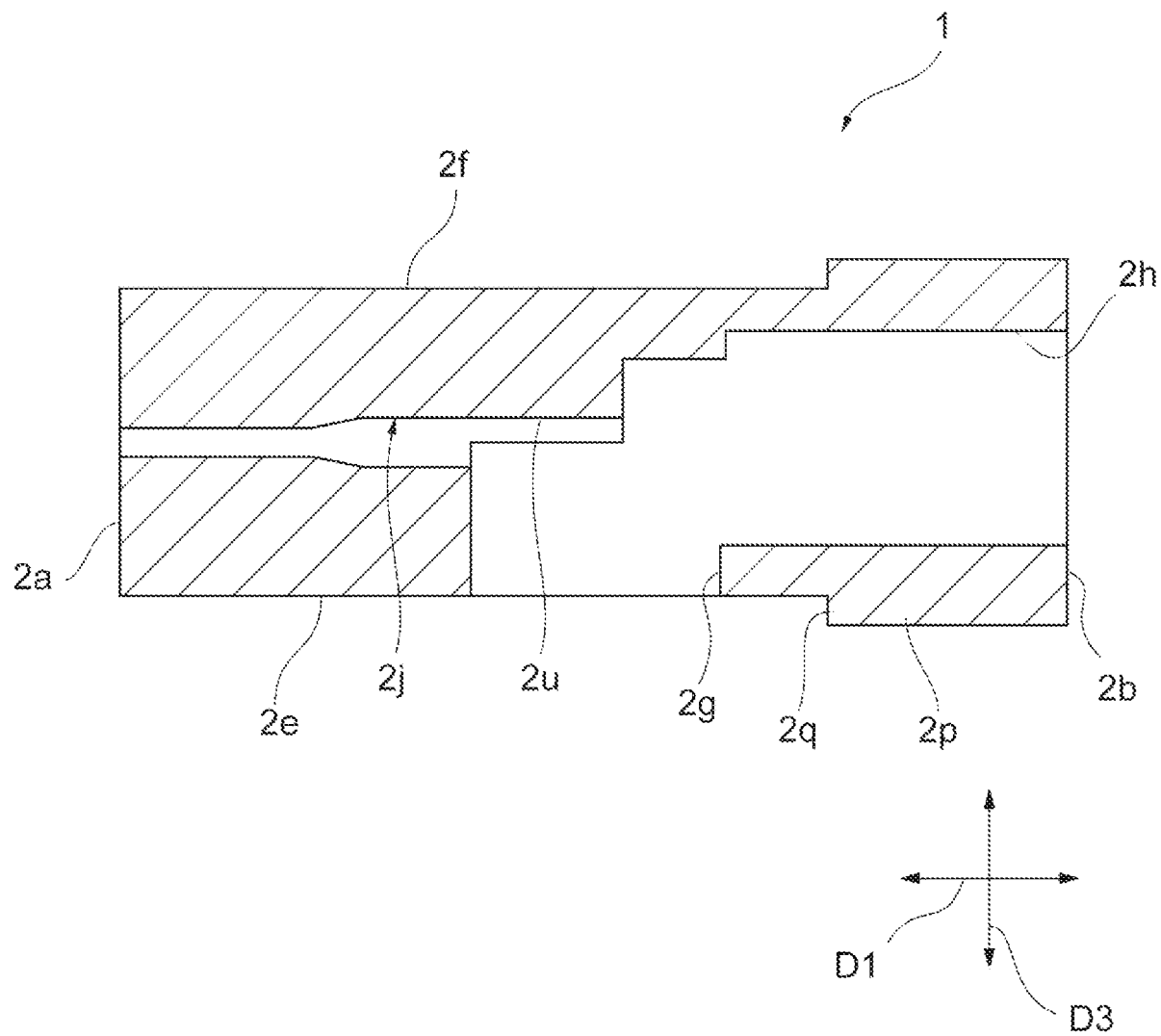
FIG. 3 is a side cross-sectional view of the optical connector ferrule shown in FIG. 1.

FIG. 3 is a side cross-sectional view of the optical connector ferrule 1. As shown in FIG. 3, a window hole 2g is provided on the upper surface 2e of the optical connector ferrule 1. The window hole 2g is an inlet hole through which an adhesive for fixing an optical fiber is introduced into the optical connector ferrule 1. On the second end surface 2b, an inlet port 2h through which a plurality of the optical fibers are collectively received is formed. For example, the plurality of optical fibers are introduced into the inlet port 2h in the form of 0.25 mm optical fibers, 0.9 mm jacketed optical fibers, a ribbon, or the like.

The optical connector ferrule 1 further has a plurality of optical fiber holding holes 2j. Each of the optical fiber holding holes 2j holds an inserted optical fiber. The plurality of optical fiber holding holes 2j extend through from the inlet port 2h to the first end surface 2a. A front end of each of the optical fiber holding holes 2j is open on the first end surface 2a. Each of the optical fiber holding holes 2j extends in the first direction D1, and a center axis direction of each of the optical fiber holding holes 2j coincides with the first direction D1. The openings of the plurality of optical fiber holding holes 2j are arranged in a row along the second direction D2 on the first end surface 2a.

The optical connector ferrule 1 further has a pair of guide holes 2k and 2m. The guide holes 2k and 2m are open on the first end surface 2a. Into the guide holes 2k and 2m, guide pins of a ferrule of the mating connector connected to the optical connector ferrule 1 are inserted. The guide pins fix a relative position between the optical connector ferrule 1 and the ferrule of the mating connector. The pair of guide holes 2k and 2m are arranged side by side, along the second direction D2, so as to place the plurality of optical fiber holding holes 2j between the guide holes 2k and 2m (in other words, arranged at both ends of the row of the optical fiber holding holes 2j). From each of the plurality of optical fiber holding holes 2j, a fiber groove 2u extends in the first direction D1 and faces the window hole 2g in the third direction D3.

The optical connector ferrule 1 further has a flange portion 2p and a gate mark 2n formed on the flange portion 2p. The flange portion 2p is provided adjacent to the second end surface 2b of the optical connector ferrule 1, and extends outward to form a step on an outer peripheral surface of the optical connector ferrule 1. Specifically, the flange portion 2p extends outward of the optical connector ferrule 1 from each of the side surfaces 2c and 2d, the upper surface 2e, and the lower surface 2f to form a step 2q of the optical connector ferrule 1.

The gate mark 2n is provided on the side surface 2c of the optical connector ferrule 1 adjacent to the second end surface 2b. The gate mark 2n is a hardened portion in a gate through which the resin of which the optical connector ferrule 1 is made is poured when the optical connector ferrule 1 is manufactured. That is, the gate mark 2n is a mark produced during injection molding of the optical connector ferrule 1. The gate mark 2n has, for example, an approximate rectangular shape having the third direction D3 as a longitudinal direction and the first direction D1 as a lateral direction, and may be uneven. According to the present embodiment, the gate mark 2n is formed on a surface of the flange portion 2p of the side surface 2c, but the number, size, and position of the gate mark may be changed as needed. For example, the gate mark may be formed on the surface of the flange portion 2p of the side surface 2d, or alternatively, may be formed on the respective surfaces of two flange portions 2p of the side surfaces 2c and 2d.

Figure 4:
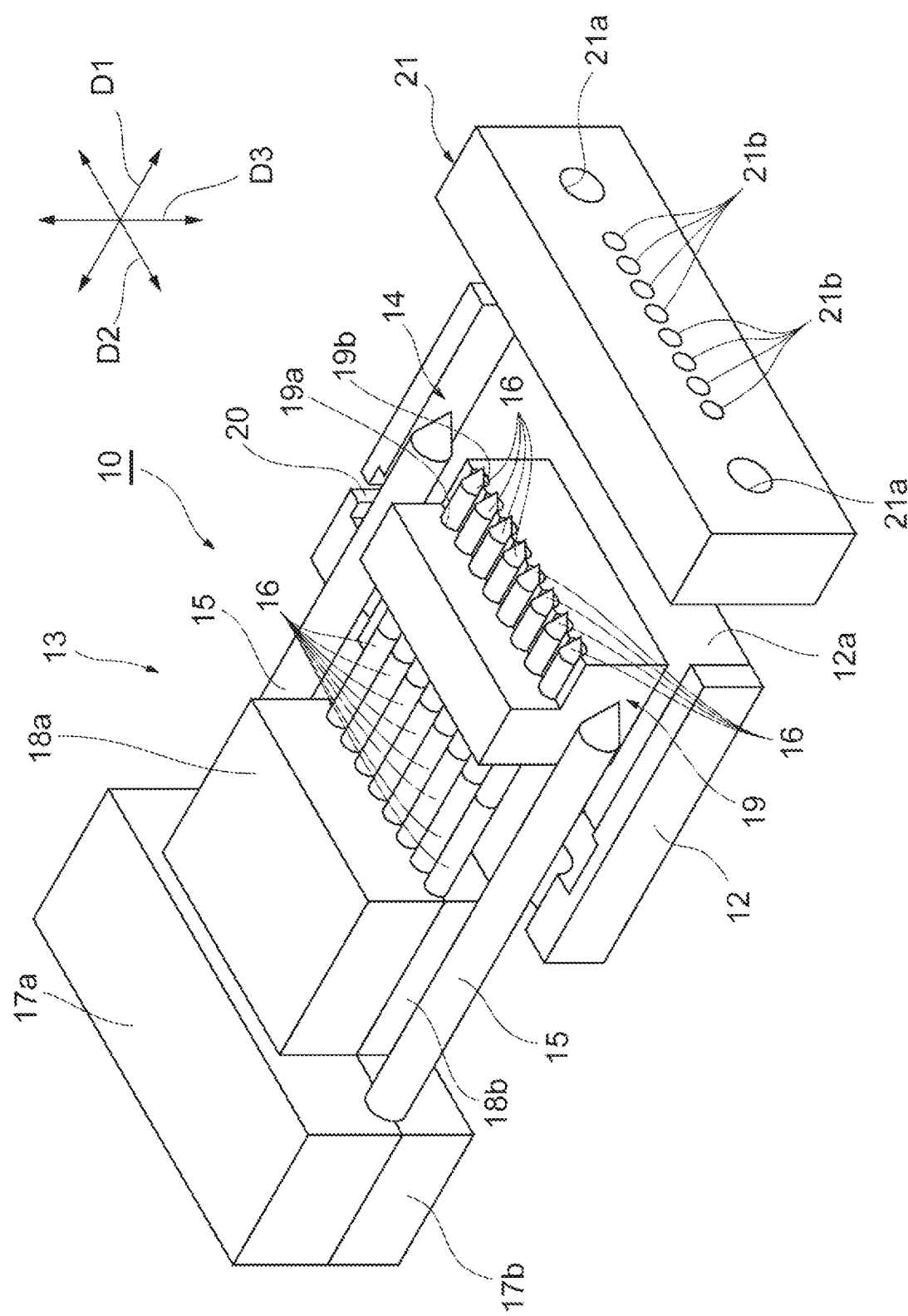
FIG. 4 is a perspective view of an example of a mold to be used in manufacture of the optical connector ferrule shown in FIG. 1.

A description will be given below, with reference to FIG. 4, of a mold 10 that is a mold for molding an optical connector ferrule, the mold 10 being used in molding of the optical connector ferrule 1. FIG. 4 is a perspective view showing, in a simplified manner, of a structure of the mold 10. The mold 10 includes an upper mold, a lower mold 12, and a middle mold 13. The middle mold 13 is sandwiched between the upper mold and the lower mold 12, thereby forming a cavity 14 including an inner space into which molten resin is introduced.

The lower mold 12 has a bottom surface 12a that extends along the first direction D1 and the second direction D2 and defines the cavity 14 of the mold 10. In the middle mold 13, two guide hole forming pins 15 configured to form the guide holes 2k and 2m of the optical connector ferrule 1 extend in the first direction D1. Between the two guide hole forming pins 15, optical fiber hole forming pins 16 (mold pins) that are a plurality of core pins configured to form the optical fiber holding holes 2j of the optical connector ferrule 1 are arranged side by side and extend in the first direction D1. Note that the numbers and arrangements of the guide hole forming pins 15 and the optical fiber hole forming pins 16 are changed as needed. The number of the optical fiber hole forming pins 16 is, for example, 8, 12, or 16.

The plurality of optical fiber hole forming pins 16 extend along the bottom surface 12a. Proximal ends of the guide hole forming pins 15 and proximal ends of the optical fiber hole forming pins 16 are sandwiched and held between a pair of holding members 17a and 17b. The proximal ends of the optical fiber hole forming pins 16 are further held by an upper holding member 18a and a lower holding member 18b that are thinner than the holding members 17a and 17b. The upper holding member 18a and the lower holding member 18b are held by the holding member 17a and the holding member 17b, for example. The holding member 17a and the holding member 17b are fastened to each other with a screw, for example. The upper holding member 18a and the lower holding member 18b define the inlet port 2h of the optical connector ferrule 1. Further, the holding member 17a and the upper holding member 18a may be integrally provided, and the holding member 17b and the lower holding member 18b may be integrally provided.

Provided at a center of the bottom surface 12a of the lower mold 12 is a cavity support 19 configured to form the window hole 2g in the optical connector ferrule 1. The cavity support 19 has a stepped shape for forming an inner surface of the window hole 2g of the optical connector ferrule 1. The cavity support 19 has a plurality of insertion holes 19a for accommodating the optical fiber hole forming pins 16. A front portion of each of the insertion holes 19a of the cavity support 19 is a C-shaped groove 19b that is open upward. A half of circumference of the optical fiber hole forming pin 16 accommodated in each of the C-shaped grooves 19b is put into the C-shaped groove 19b.

The mold 10 further has a gate 20 serving as a filling port for molten resin with the mold closed. The gate 20 is disposed at a position corresponding to the side surface 2c of the optical connector ferrule 1 (that is, at a position adjacent to the second end surface 2b relative to the step 2q). The gate 20 has an opening shape that forms the above-described gate mark 2n and corresponds to a planar shape of the gate mark 2n. A cutout portion formed in the upper mold and a cutout portion formed in the lower mold 12 are aligned with each other to form the gate 20, for example. However, the gate 20 may be provided only in the lower mold 12.

Figure 5A:
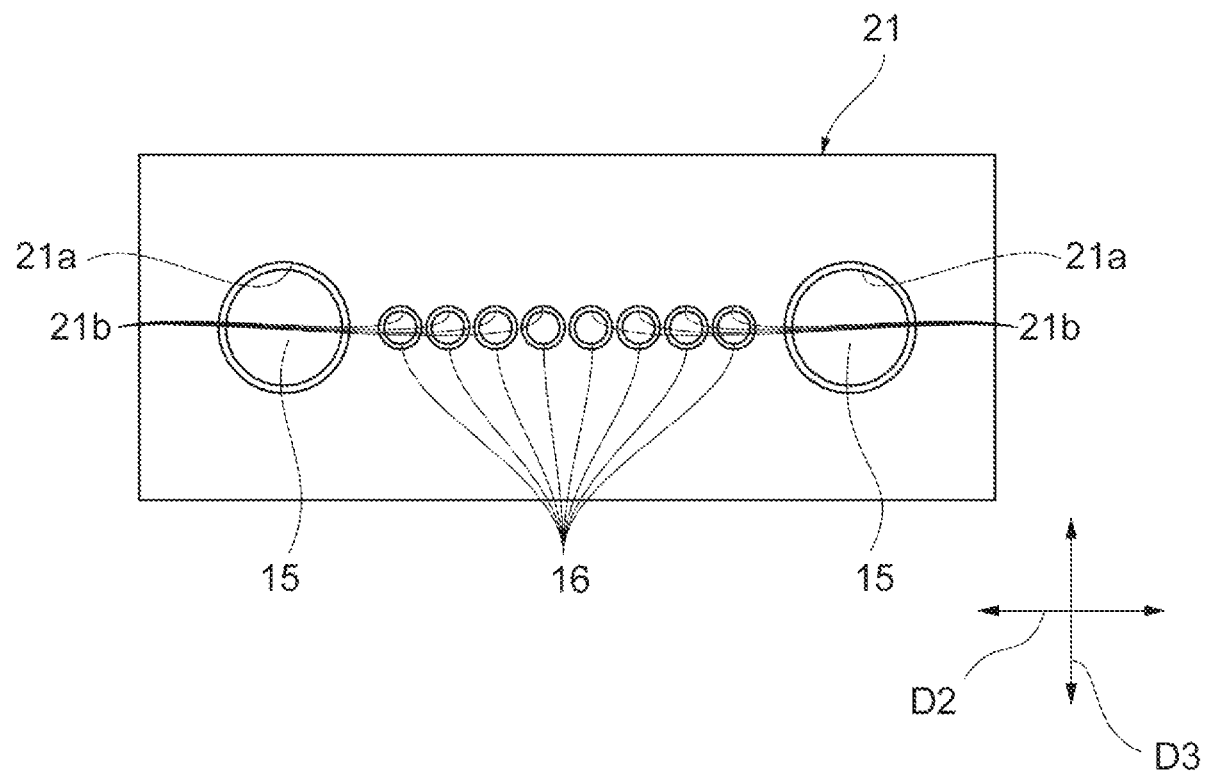
FIG. 5A is a front view of an example of a catcher plate of the mold shown in FIG. 4.
Figure 5B:
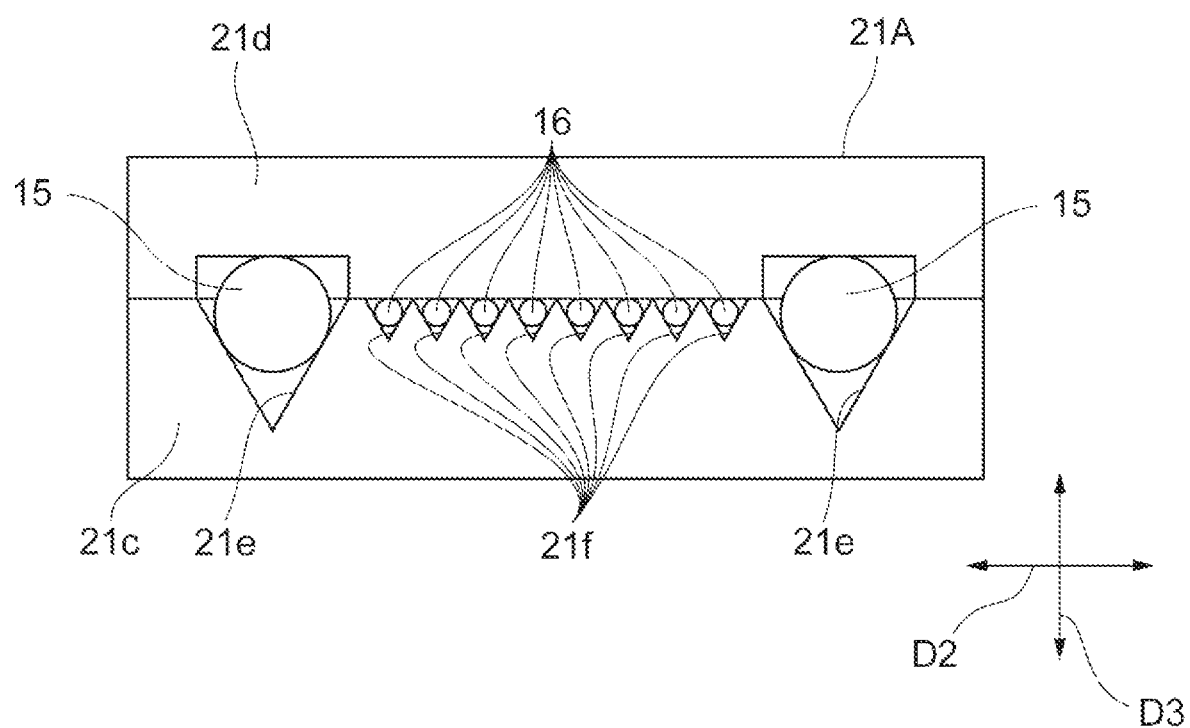
FIG. 5B is a front view of an example of a catcher plate different from the catcher plate shown in FIG. 5A.

Provided at a front end of the lower mold 12 is a catcher plate 21 serving as a pin holding member. FIG. 5A is a front view of an example of the catcher plate 21, and FIG. 5B is a front view of an example of a catcher plate 21A different from the catcher plate 21 shown in FIG. 5A. The catcher plate 21 has two first through holes 21a configured to position the two guide hole forming pins 15 and a plurality of second through holes 21b that are positioned between the two first through holes 21a and configured to position the plurality of optical fiber hole forming pins 16. In the example shown in FIG. 5A, the first through holes 21a and the second through holes 21b are round holes.

The catcher plate 21A includes a pair of split members 21c and 21d aligned in the third direction D3, and the split member 21c that is one of the split members has first V-shaped grooves 21e on which the guide hole forming pins 15 are placed and second V-shaped grooves 21f on which the optical fiber hole forming pins 16 are placed. The split member 21d that is the other split member presses, in the third direction D3, the guide hole forming pins 15 and the optical fiber hole forming pins 16 placed on the first V-shaped grooves 21e and the second V-shaped grooves 21f, respectively, and the split member 21c. This allows adjustments to the positions of the optical fiber holding holes 2j and the guide holes 2k and 2m of the optical connector ferrule 1 in the third direction D3.

In the meantime, the openings of the optical fiber holding holes 2j formed on the first end surface 2a of the optical connector ferrule 1 are arranged in a row along the second direction D2 between the pair of guide holes 2k and 2m. Specifically, the circular openings of the optical fiber holding holes 2j are arranged such that their centers are located along a reference line L1 connecting centers of the guide holes 2k and 2m. That is, the position of the opening of each of the optical fiber holding holes 2j on the first end surface 2a is defined as coordinates, and the optical fiber holding holes 2j are arranged, at equal intervals, at predetermined positions on the reference line L1 determined by the coordinates.

Figure 6A:
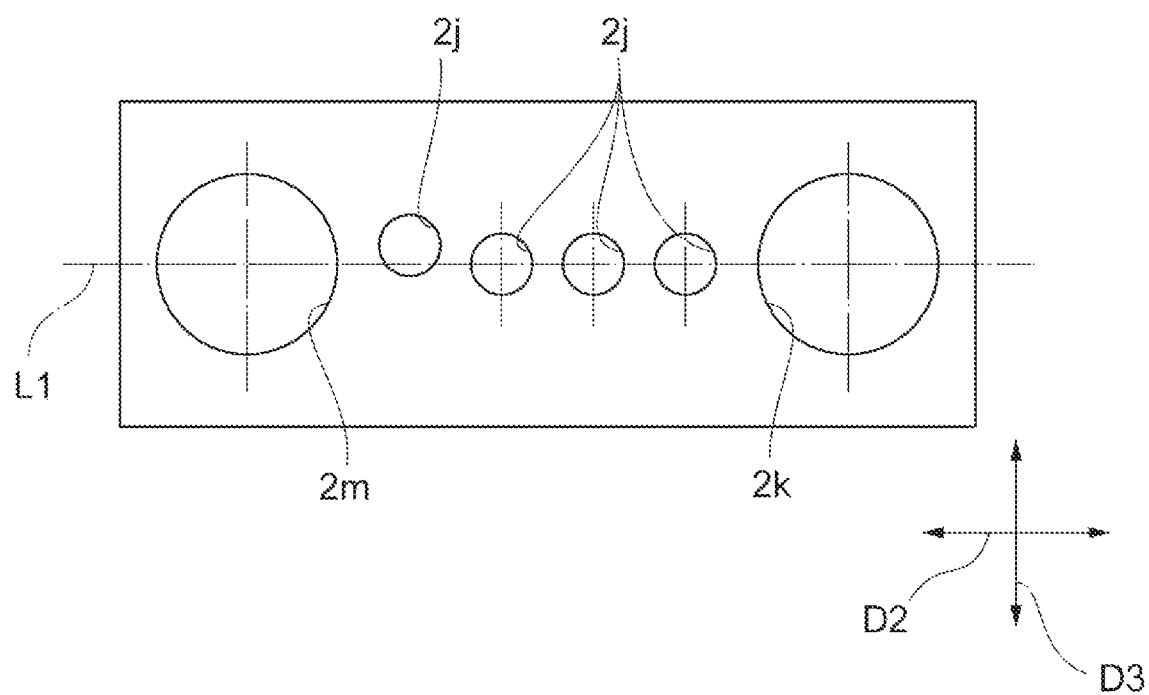
FIG. 6A is a diagram schematically showing eccentricity of an optical fiber holding hole.
Figure 6B:
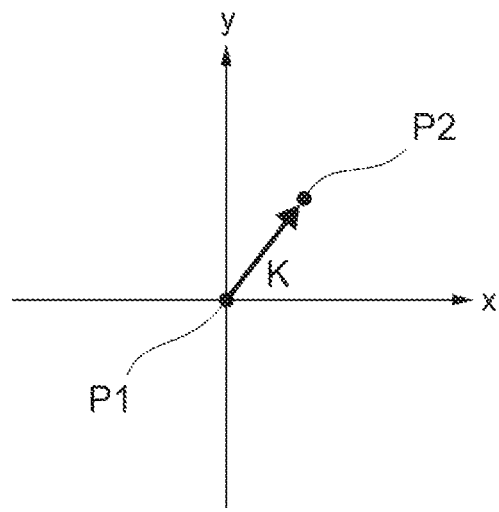
FIG. 6B is a diagram schematically showing details of the eccentricity shown in FIG. 6A.

However, as shown in FIG. 6A, for example, the centers of the optical fiber holding holes 2j may be misaligned relative to the predetermined positions on the reference line L1. The misalignment of the optical fiber holding holes 2j relative to the predetermined positions is referred to as eccentricity. FIG. 6A shows an example where one of the plurality of optical fiber holding holes 2j is eccentric, and FIG. 6B is a diagram for describing the eccentricity. As shown in FIG. 6B, assuming that the second direction D2 is the X direction and the third direction D3 is the Y direction, an amount of the eccentricity is represented by a distance K from a predetermined position P1 to an actual center position P2 of the optical fiber holding hole 2j. The allowable amount of eccentricity is, for example, 0.8 µm, and the distance K is required to be equal to or less than 0.8 µm.

Figure 7:
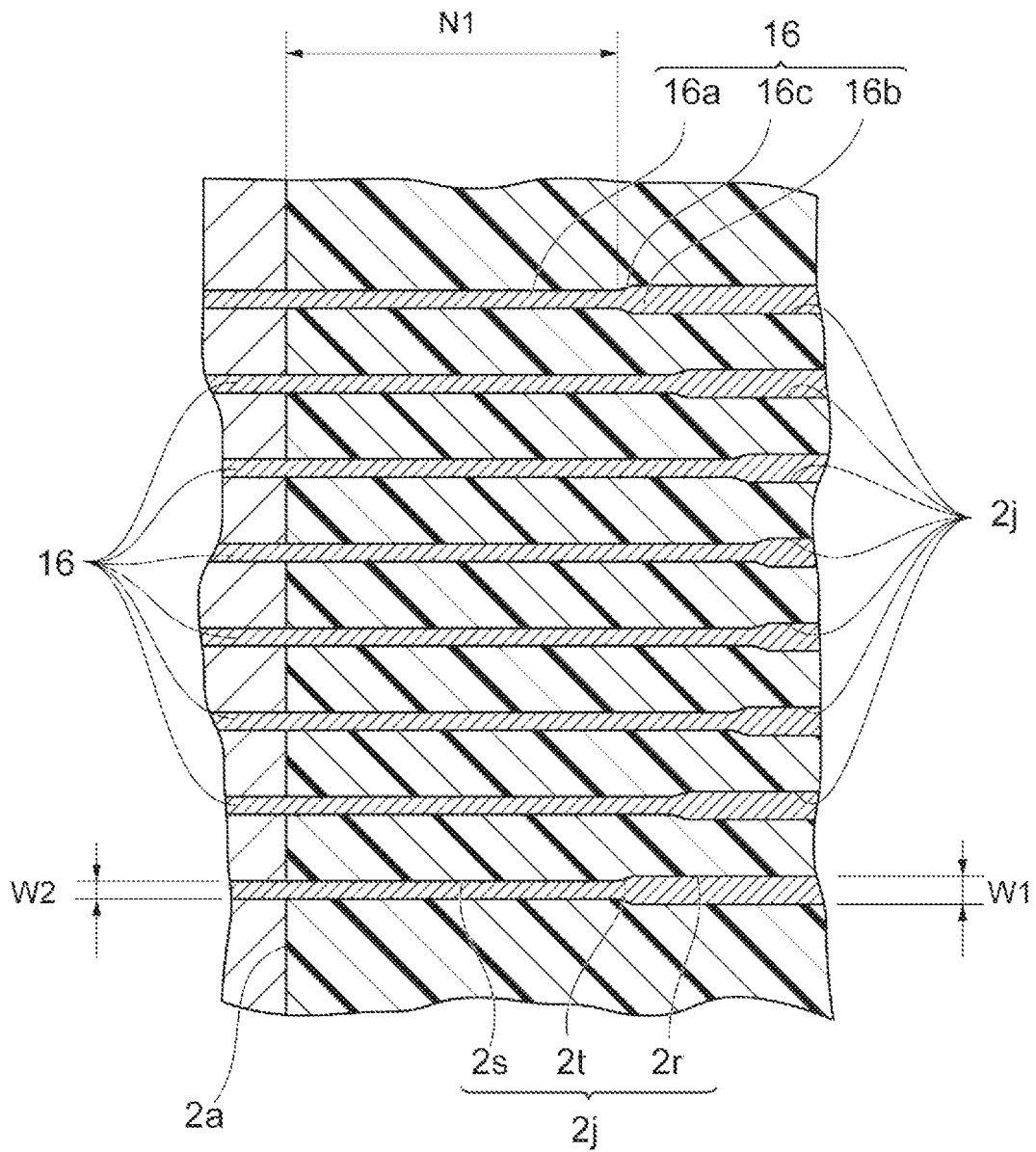
FIG. 7 is a diagram showing an arrangement of mold pins of the mold shown in FIG. 4.

FIG. 7 is a cross-sectional view of the optical connector ferrule 1 together with the optical fiber hole forming pins 16 of the mold 10 when the optical fiber holding holes 2j are cut along a plane extending in the first direction D1 and the second direction D2. As shown in FIG. 7, the plurality of optical fiber holding holes 2j are arranged side by side along the second direction D2. Each of the optical fiber holding holes 2j has a large diameter portion 2r with an inner diameter W1 and a small diameter portion 2s with an inner diameter W2 smaller than W1. Provided at a boundary between the large diameter portion 2r and the small diameter portion 2s is a step portion 2t. The large diameter portion 2r is located adjacent to the window hole 2g (the second end surface 2b), and the small diameter portion 2s is located adjacent to the first end surface 2a.

For example, in each of the optical fiber holding holes 2j, a length N1 of the small diameter portion 2s in the first direction D1 is larger than a length of the large diameter portion 2r in the first direction D1. Further, the length N1, in the first direction D1, of small diameter portions 2s located adjacent to the center in the second direction D2 is larger than the length N1 of small diameter portions 2s located adjacent to both the ends in the second direction D2. On the other hand, the above-described optical fiber hole forming pins 16 of the mold 10 have first portions 16a configured to form the small diameter portions 2s of the optical fiber holding holes 2j and second portions 16b configured to form the large diameter portions 2r of the optical fiber holding holes 2j. A relationship between the first portion 16a and the second portion 16b is the same as a relationship between the small diameter portion 2s and the large diameter portion 2r.

That is, the length, in the first direction D1, of first portions 16a located adjacent to the center in the second direction D2 is larger than the length, in the first direction D1, of first portions 16a located adjacent to both the ends in the second direction D2. Further, provided between the first portion 16a and the second portion 16b is a step portion 16c. A diameter (inner diameter W2) of the first portion 16a is, for example, in a range of from 80 µm to 128 µm, both inclusive, and is 80 µm or 125 µm, for example. A diameter (inner diameter W1) of the second portion 16b is, for example, in a range of from 100 µm to 250 µm, both inclusive, and is 100 µm or 200 µm, for example.

Next, a description will be given of a method for manufacturing an optical connector ferrule according to the present embodiment. First, the guide hole forming pins 15 and the optical fiber hole forming pins 16 are held by the holding members 17a and 17b, the upper holding member 18a, and the lower holding member 18b. Then, pushing the middle mold 13 toward distal ends of the guide hole forming pins 15 and the optical fiber hole forming pins 16 puts the guide hole forming pins 15 and the optical fiber hole forming pins 16 into the first through holes 21a and the second through holes 21b of the catcher plate 21.

At this time, the optical fiber hole forming pins 16 are also put through the insertion holes 19a of the cavity support 19. Then, the upper mold is closed to the lower mold 12, and the molten resin is introduced into the cavity 14 from the gate 20. At this time, the molten resin is introduced from the gate 20 into the cavity 14 that defines a shape corresponding to the shape of the optical connector ferrule 1. The molten resin is, for example, polyphenylene sulfide (PPS). Then, after the molten resin starts to harden and then hardens completely, the upper mold and the lower mold 12 are unfastened, the middle mold 13 is pulled out, the upper mold and the lower mold 12 are disassembled, and, as a result, the optical connector ferrule 1 is obtained (step of forming the optical connector ferrule).

In the meantime, for example, as shown in FIG. 14 and FIG. 15, when the lengths L of the small diameter portions 101 are identical to each other along the second direction D2 (X direction) in which the mold pins 100 that are optical fiber hole forming pins in the related art are arranged side by side, a phenomenon may occur where the positions of the optical fiber holding holes 112 on the end surface 111 of the optical connector ferrule 110 are misaligned in a curve shape in the third direction D3. That is, optical fiber holding holes 112 located adjacent to the center in the second direction D2 are formed at positions misaligned in the third direction D3 (Y direction) as compared with optical fiber holding holes 112 located adjacent to both the ends in the second direction D2. This is due to the flow (filling pressure, filling order, etc.) of resin used for molding, asymmetric shrinkage of the resin, and the like.

On the other hand, the following action and effect can be obtained from the method for manufacturing the optical connector ferrule 1 and the optical connector ferrule 1 according to the present embodiment. As shown in FIG. 7, under the method for manufacturing the optical connector ferrule 1, the resin is introduced into the cavity 14 of the mold 10 and then hardened, thereby manufacturing the optical connector ferrule 1. The mold 10 includes the plurality of optical fiber hole forming pins 16 serving as the mold pins configured to form the plurality of optical fiber holding holes 2j, and at least one of the plurality of optical fiber hole forming pins 16 is different from the other optical fiber hole forming pins 16 in position of the step portion 16c in the first direction D1.

That is, the length N1 of the first portion 16a that is the small diameter portion of at least one of the optical fiber hole forming pins 16 is different from the lengths N1 of the first portions 16a of the other optical fiber hole forming pins 16. Accordingly, making the lengths N1 of the first portions 16a of the plurality of optical fiber hole forming pins 16 different from each other allows adjustments to positions of the optical fiber holding holes 2j in the third direction D3 that is the width direction of the first end surface 2a of the optical connector ferrule 1.

Further, the mold 10 includes the gate 20 configured to introduce the resin into the cavity 14, the gate 20 being located adjacent to the second end surface 2b in the first direction D1 relative to the window hole 2g (adjacent to the upper holding member 18a and the lower holding member 18b relative to the cavity support 19). Since the gate 20 of the mold 10 is provided adjacent to the second end surface 2b of the optical connector ferrule 1 relative to the window hole 2g, the position of the gate 20 is located away from the first end surface 2a where the openings of the optical fiber holding holes 2j are formed. Therefore, setting the position of the gate 20 away from the first end surface 2a allows more effective adjustments to the positions of the optical fiber holding holes 2j in the third direction D3 of the first end surface 2a.

Figure 8:
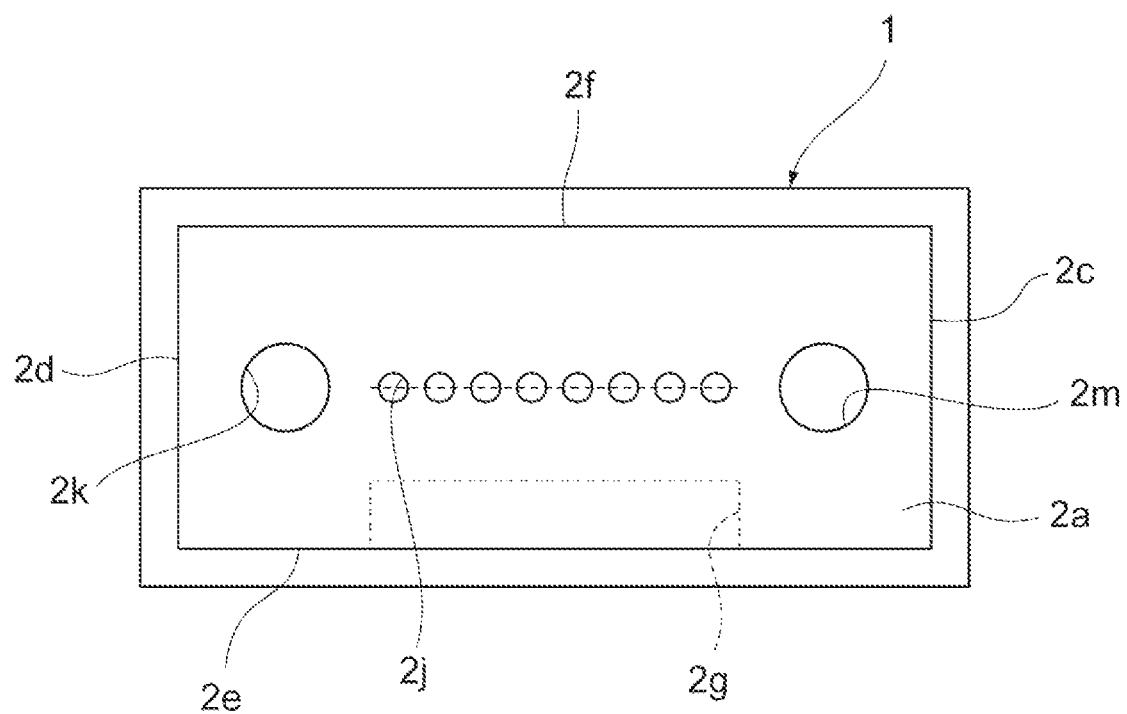
FIG. 8 is a diagram showing an end surface of an optical connector ferrule manufactured by using the mold pins shown in FIG. 7.
Figure 8:
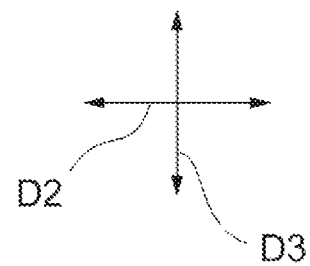

Further, the first portions 16a of the optical fiber hole forming pins 16 become longer and longer from both the ends in the second direction D2 toward the center. Therefore, the structure where the first portions 16a configured to form the small diameter portions 2s become longer and longer toward the center in the second direction D2 in which the optical fiber holding holes 2j are arranged side by side can suppress, as shown in FIG. 8, misalignment of the optical fiber holding holes 2j located adjacent to the center in the second direction D2. Therefore, it is possible to suppress the phenomenon where the positions of the optical fiber holding holes 2j are curved in the third direction D3.

Further, the diameter of the first portions 16a of the optical fiber hole forming pins 16 is in a range of from 80 μm to 128 μm, both inclusive. This allows more effective adjustments to the positions of the optical fiber holding holes 2j in the third direction D3 on the first end surface 2a. Further, the diameter of the second portions 16b of the optical fiber hole forming pins 16 is in a range of from 100 μm to 250 μm, both inclusive. This allows more effective adjustments to the positions of the optical fiber holding holes 2j in the third direction D3 on the first end surface 2a.

The optical connector ferrule 1 according to the present embodiment has the first end surface 2a, the second end surface 2b, the pair of side surfaces 2c and 2d, the upper surface 2e, and the lower surface 2f, and the inlet port 2h through which the plurality of optical fibers are collectively introduced is formed on the second end surface 2b. The optical connector ferrule 1 further has the window hole 2g extending from the upper surface 2e to the inlet port 2h and the optical fiber holding holes 2j extending through from the inlet port 2h to the first end surface 2a along the first direction D1. Each of the optical fiber holding holes 2j has the small diameter portion 2s located adjacent to the first end surface 2a and the large diameter portion 2r located adjacent to the second end surface 2b. The small diameter portions 2s of the optical fiber holding holes 2j in the first direction D1 become longer and longer toward the center from both the ends in the second direction D2 in which the optical fiber holding holes 2j are arranged side by side.

Accordingly, making the lengths of the small diameter portions 2s of the optical fiber holding hole 2j different from each other allows adjustments to the positions, in the third direction D3, of the optical fiber holding holes 2j on the first end surface 2a. Further, the structure where the small diameter portions 2s become longer and longer in the first direction D1 from both the ends in the second direction D2 toward the center can suppress misalignment of the optical fiber holding holes 2j located adjacent to the center in the second direction D2. Therefore, it is possible to suppress the phenomenon where the positions of the optical fiber holding holes 2j are curved in the third direction D3.

Second Embodiment

Figure 9:
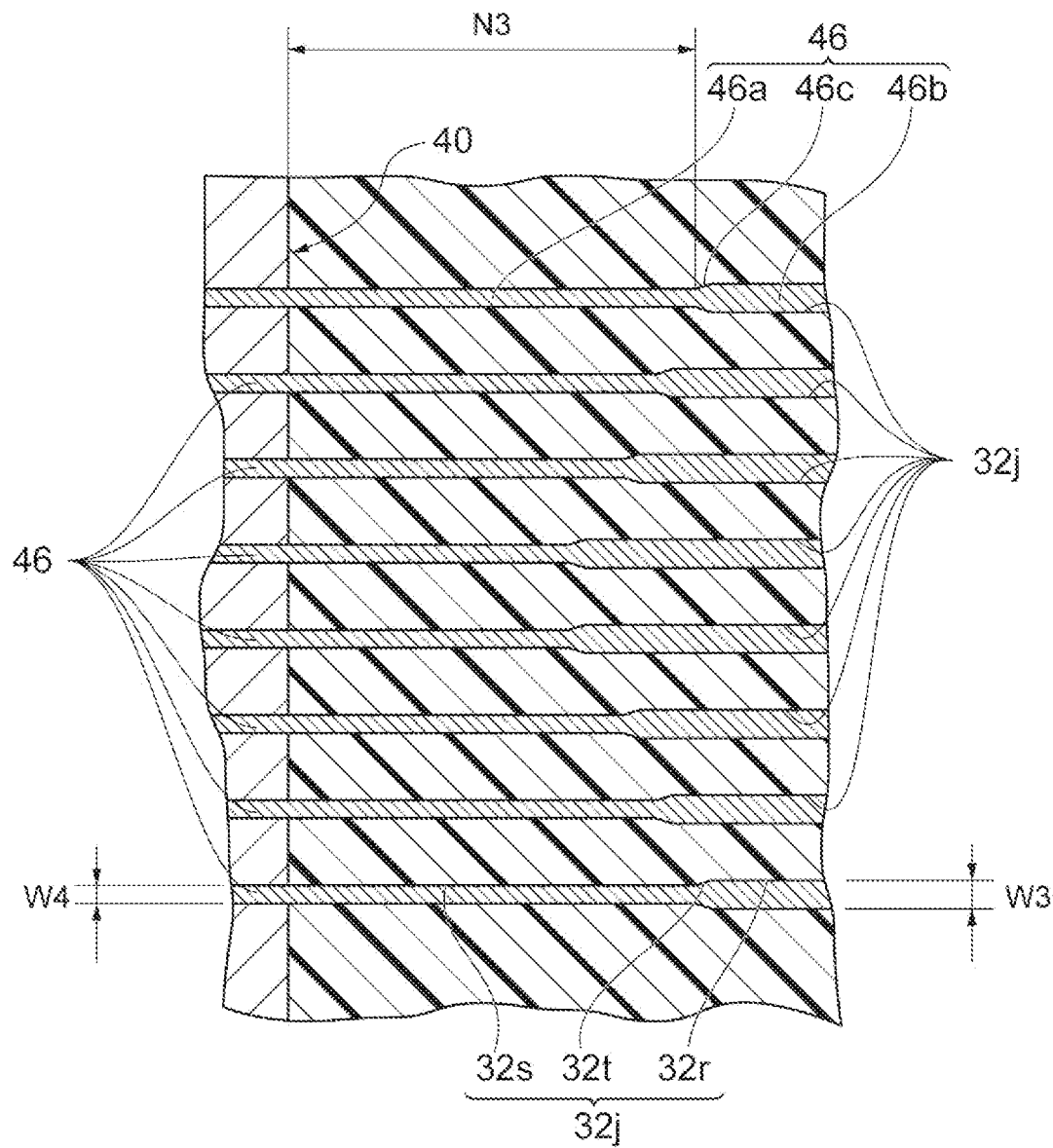
FIG. 9 is a diagram showing an arrangement of mold pins to be used in manufacture of an optical connector ferrule according to a second embodiment.
Figure 10:
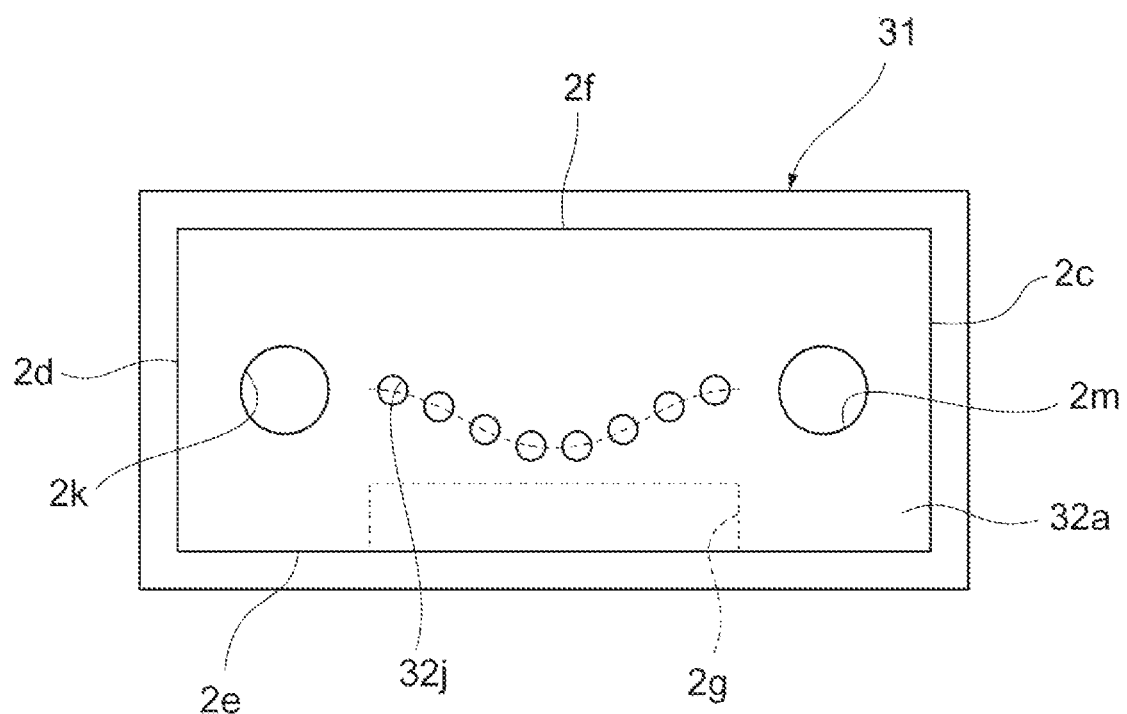
FIG. 10 is a diagram showing an end surface of an optical connector ferrule manufactured by using the mold pins shown in FIG. 9.
Figure 10:
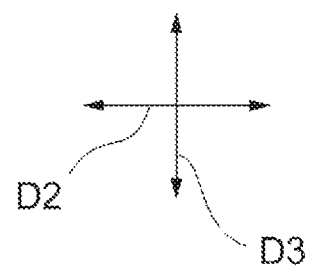

Next, a description will be given of an optical connector ferrule 31 according to a second embodiment with reference to FIG. 9 and FIG. 10. FIG. 9 is a cross-sectional view of the optical connector ferrule 31 when optical fiber holding holes 32j are cut along a plane extending in the first direction D1 and the second direction D2. FIG. 10 is a front view of the optical connector ferrule 31, showing a first end surface 32a. The optical connector ferrule 31 is different from the first embodiment in that the optical connector ferrule 31 has the optical fiber holding holes 32j different from the optical fiber holding holes 2j and has a mold 40 different from the mold 10. In the following description, any redundant description that has been already given for the first embodiment will be omitted as appropriate.

As shown in FIG. 9, the plurality of optical fiber holding holes 32j are arranged side by side along the second direction D2 and each has a large diameter portion 32r with an inner diameter W3 and a small diameter portion 32s with an inner diameter W4 smaller than W3. Provided at a boundary between the large diameter portion 32r and the small diameter portion 32s is a step portion 32t. A length N3, in the first direction D1, of small diameter portions 32s located adjacent to the center in the second direction D2 is smaller than the length N3, in the first direction D1, of small diameter portions 32s located adjacent to both the ends in the second direction D2.

On the other hand, optical fiber hole forming pins 46 of the mold 40 according to the second embodiment each have a first portion 46a configured to form the small diameter portion 32s and a second portion 46b configured to form the large diameter portion 32r. Provided between the first portion 46a and the second portion 46b is a step portion 46c. A length, in the first direction D1, of first portions 46a located adjacent to the center in the second direction D2 is smaller than a length, in the first direction D1, of first portions 46a located adjacent to both the ends in the second direction D2.

As described above, in the optical connector ferrule 31 according to the second embodiment and under the method for manufacturing the optical connector ferrule 31 according to the second embodiment, the first portions 46a of the optical fiber hole forming pins 46 become shorter and shorter from both the ends in the second direction D2 toward the center. Accordingly, making the lengths of the first portions 46a of the plurality of optical fiber hole forming pins 46 different from each other allows, as shown in FIG. 10, adjustments to positions, in the third direction D3, of the optical fiber holding holes 32j on the first end surface 32a of the optical connector ferrule 31. In the optical connector ferrule 31 according to the second embodiment, the small diameter portions 32s become shorter and shorter in the first direction D1 from both the ends in the second direction D2 toward the center. This allows the positions of the optical fiber holding holes 32j to be further curved in the third direction D3.

EXAMPLE

A description will be given below of an optical connector ferrule according to an example. In an experiment according to the example, a relationship between the length of the small diameter portion of each of the plurality of optical fiber holding holes of the optical connector ferrule (for example, the length N1, in the first direction D1, of the small diameter portion 2s shown in FIG. 7) and the amount of eccentricity of the optical fiber holding holes on the first end surface was measured. First, in an optical connector ferrule according to a comparative example as shown in FIG. 14, a relationship between the length L and the amount of eccentricity was measured. Note that the optical connector ferrule according to the comparative example was an MT ferrule, and in the comparative example, the diameter of the small diameter portion was 80 μm, and the number of optical fiber holding holes was 16.

Figure 11A:
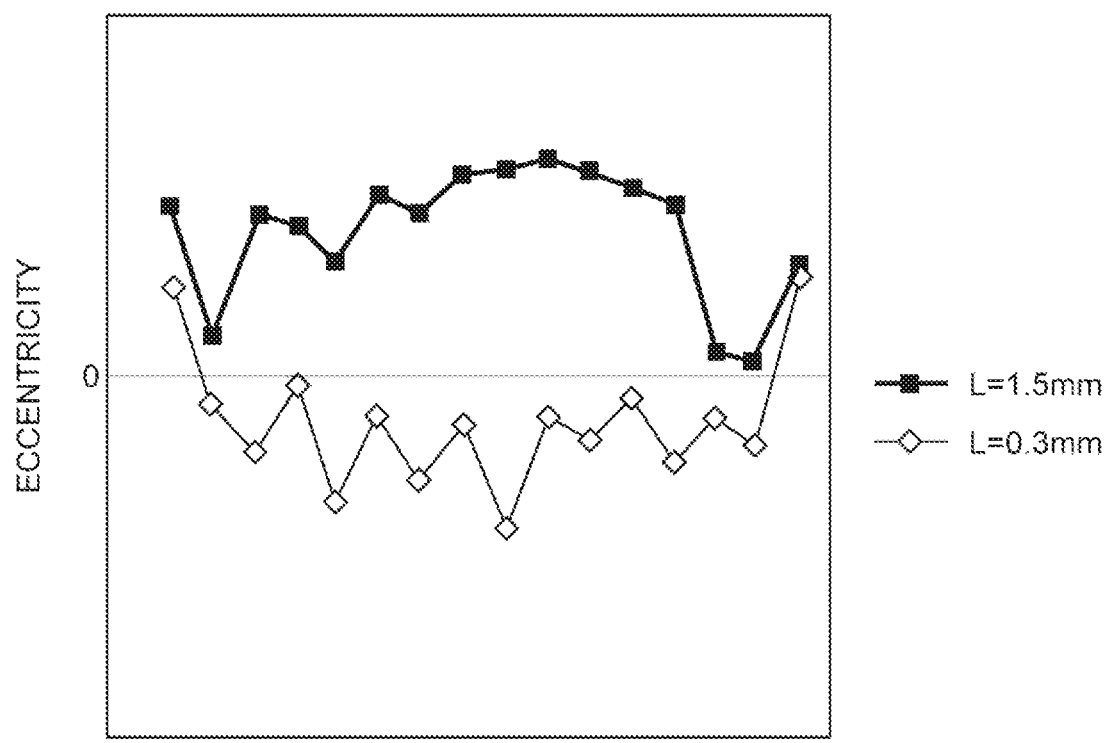
FIG. 11A is a graph showing a result of an experiment in which a relationship between a length of a small diameter portion and an amount of eccentricity is measured.

FIG. 11A is a graph showing a result of measuring the relationship between the length L and the amount of eccentricity. The horizontal axis of the graph shown in FIG. 11A represents the position of the optical fiber holding hole in the second direction D2, and the vertical axis of the graph shown in FIG. 11A represents the amount of eccentricity in the third direction D3. FIG. 11A shows a case where the length L of the small diameter portion in the first direction D1 is 1.5 mm, and a case where the length L of the small diameter portion in the first direction D1 is 0.3 μm.

Figure 11B:
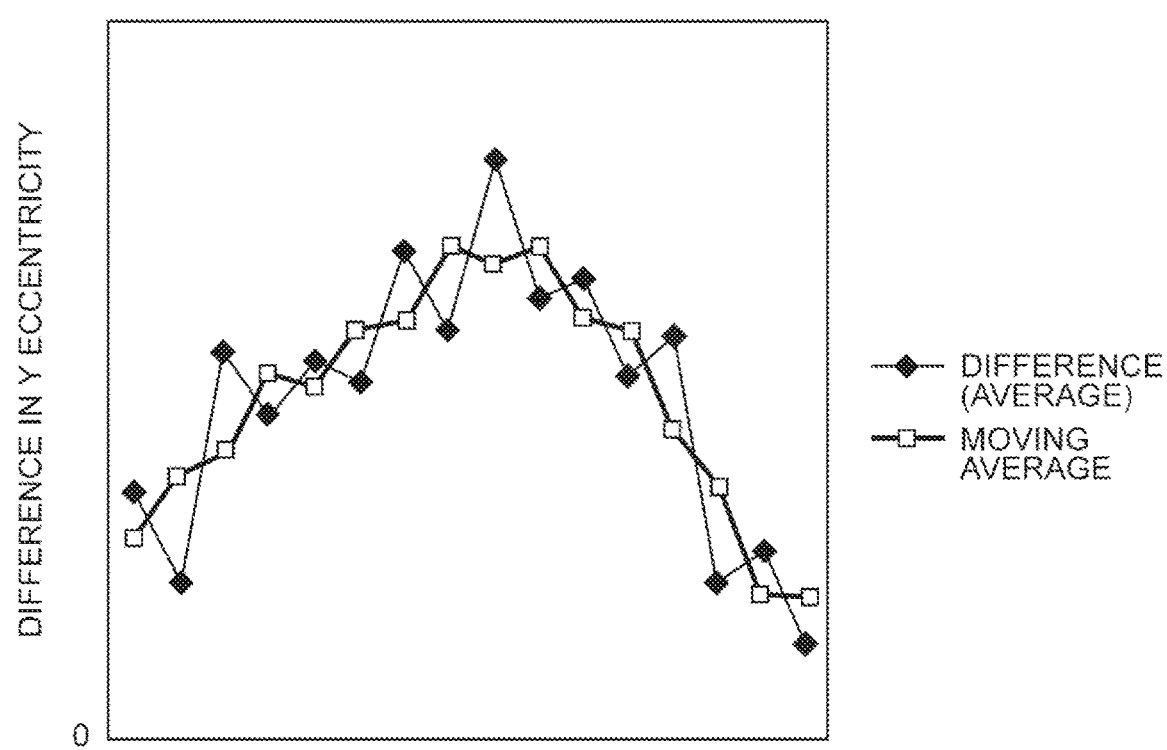
FIG. 11B is a graph showing a result of the experiment in which the relationship between the length of the small diameter portion and the amount of eccentricity is measured.

As shown in FIG. 11A, it is shown that the amount of eccentricity in the third direction D3 (Y eccentricity) is large when the length L is larger as compared with when the length L is smaller. FIG. 11B shows a difference in the amount of eccentricity between when the length L is 1.5 mm and when the length L is 0.3 mm and a moving average of the amount of eccentricity. As shown in FIG. 11B, it is shown that the difference in the amount of eccentricity and the moving average of the amount of eccentricity increase toward the center in the second direction D2. Therefore, it is shown that the larger the length L of the small diameter portion toward the center in the second direction D2, the smaller the amount of eccentricity that curves downward at the center in the second direction D2.

Next, an experiment was conducted to measure the relationship between the position of the optical fiber holding hole in the second direction D2 and the amount of eccentricity for each optical connector ferrule according to Comparative Example 1, Example 1, and Example 2.

Comparative Example 1

Provided is an optical connector ferrule having 12 optical fiber holding holes each having a small diameter portion with a diameter of 125 μm, and all the optical fiber holding holes have a length L of 1.5 mm.

Example 1

Provided is an optical connector ferrule similar to the optical connector ferrule shown in FIG. 7, the optical connector ferrule has 12 optical fiber holding holes each having a small diameter portion with a diameter of 125 μm, six of the optical fiber holding holes located adjacent to the center in the second direction D2 have a length N1 of 2.0 mm, and the other six of the optical fiber holding holes located adjacent to both the ends in the second direction D2 have a length N1 of 1.5 mm.

Example 2

Provided is an optical connector ferrule similar to the optical connector ferrule shown in FIG. 7, the optical connector ferrule has 12 optical fiber holding holes each having a small diameter portion with a diameter of 125 μm, six of the optical fiber holding holes located adjacent to the center in the second direction D2 have a length N1 of 2.0 mm, and the other six of the optical fiber holding holes located adjacent to both the ends in the second direction D2 have a length N1 of 1.0 mm.

Figure 12:
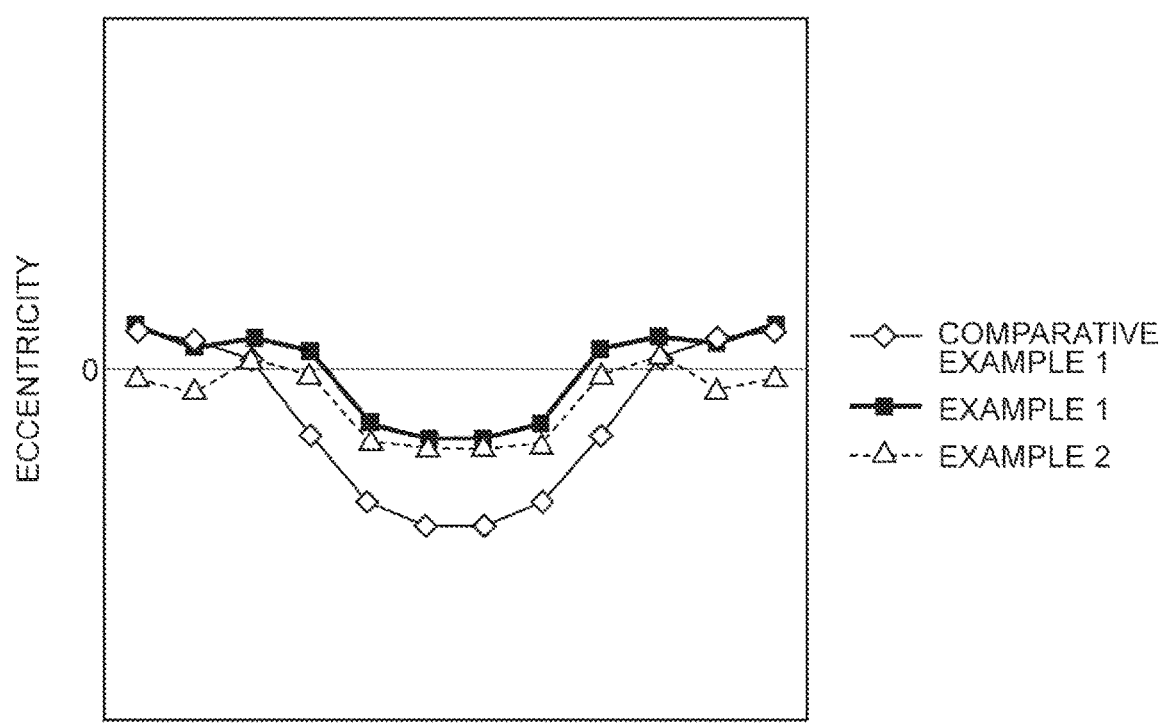
FIG. 12 is a graph showing results of experiments according to examples.

FIG. 12 shows results of measuring the amount of eccentricity in the third direction D3 for Comparative Example 1, Example 1, and Example 2. As shown in FIG. 12, it is shown that, in Comparative Example 1 where the lengths L are the same, the amount of eccentricity increases toward the center in the second direction D2. A difference between the maximum value and the minimum value of the amount of eccentricity in Comparative Example 1 was 0.34 µm. On the other hand, in Example 1 and Example 2 where the lengths N1 adjacent to the center in the second direction D2 are larger than the lengths N1 adjacent to both the ends, it is shown that the increase in the amount of eccentricity toward the center in the second direction D2 is suppressed. A difference between the maximum value and the minimum value of the amount of eccentricity in Example 1 was 0.20 µm, and a difference between the maximum value and the minimum value of the amount of eccentricity in Example 2 was 0.16 µm. As described above, it is shown that the curvature of the openings of the optical fiber holding holes can be suppressed in Example 1 and Example 2 as compared with Comparative Example 1.

Further, an experiment was conducted to measure the relationship between the position of the optical fiber holding hole in the second direction D2 and the amount of eccentricity for each optical connector ferrule according to Comparative Example 2, Example 3, and Example 4.

Comparative Example 2

Provided is an optical connector ferrule having 16 optical fiber holding holes each having a small diameter portion with a diameter of 125 µm, and all the optical fiber holding holes have a length L of 1.5 mm.

Example 3

Provided is an optical connector ferrule similar to the optical connector ferrule shown in FIG. 7, the optical connector ferrule has 16 optical fiber holding holes each having a small diameter portion with a diameter of 125 µm, eight of the optical fiber holding holes located adjacent to the center in the second direction D2 have a length N1 of 1.5 mm, and the other eight of the optical fiber holding holes located adjacent to both the ends in the second direction D2 have a length N1 of 1.0 mm.

Example 4

Provided is an optical connector ferrule similar to the optical connector ferrule shown in FIG. 7, the optical connector ferrule has 16 optical fiber holding holes each having a small diameter portion with a diameter of 125 µm, eight of the optical fiber holding holes located adjacent to the center in the second direction D2 have a length N1 of 2.0 mm, and the other eight of the optical fiber holding holes located adjacent to both the ends in the second direction D2 have a length N1 of 1.0 mm.

Figure 13:
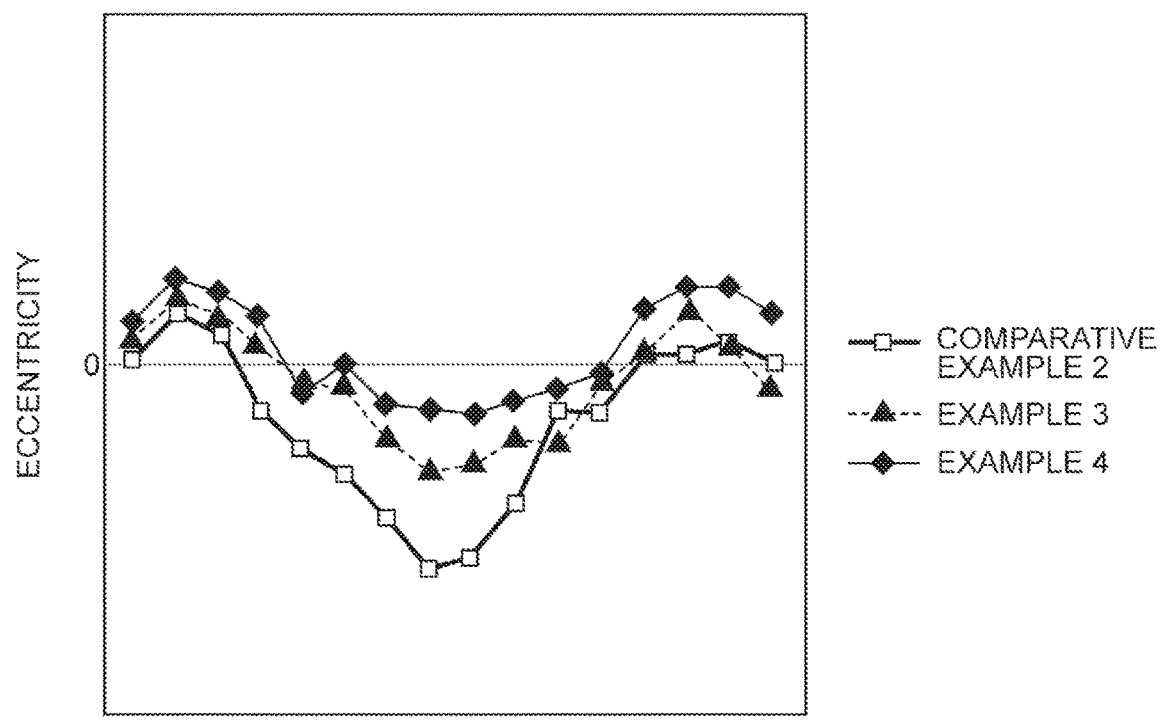
FIG. 13 is a graph showing results of experiments according to examples.

FIG. 13 shows results of measuring the amount of eccentricity in the third direction D3 for Comparative Example 2, Example 3 and Example 4. As shown in FIG. 13, it is shown that, in Comparative Example 2 where the lengths L are the same, the amount of eccentricity increases toward the center in the second direction D2. A difference between the maximum value and the minimum value of the amount of eccentricity in Comparative Example 2 was 0.57 µm. On the other hand, in Example 3 and Example 4 where the lengths N1 adjacent to the center in the second direction D2 are larger than the lengths N1 adjacent to both the ends, it is shown that the increase in the amount of eccentricity toward the center in the second direction D2 is suppressed.

A difference between the maximum value and the minimum value of the amount of eccentricity in Example 3 was 0.43 µm, and a difference between the maximum value and the minimum value of the amount of eccentricity in Example 4 was 0.30 µm. It is shown that the curvature of the openings of the optical fiber holding holes can be suppressed in Example 3 and Example 4 as compared with Comparative Example 2. As in each of the above examples, it is shown that changing the length of the small diameter portion of at least one optical fiber holding hole relative to the other optical fiber holding holes allows adjustments to the positions of the openings.

The embodiments and examples of the method for manufacturing the optical connector ferrule and the optical connector ferrule according to the present disclosure have been described above. However, the method for manufacturing the optical connector ferrule and the optical connector ferrule according to the present disclosure are not limited to the above-described embodiments or examples, and various modifications are possible. That is, details of the step of the method for manufacturing the optical connector ferrule and the structure of each component of the optical connector ferrule may be changed as needed.

For example, in the above-described embodiments, the optical connector ferrule 1 in which the small diameter portions 2s become longer and longer in the first direction D1 from both the ends in the second direction D2 toward the center has been described. However, the plurality of optical fiber holding holes may include a plurality of first fiber hole groups located adjacent to both the ends in the second direction D2 and a plurality of second fiber hole groups located adjacent to the center in the second direction D2, and the first fiber hole groups may be different in length of the small diameter portion from the second fiber hole groups. In short, the lengths of the small diameter portions may vary stepwise in each fiber hole group. Also in this case, the effect of adjusting the positions of the openings on the first end surface can be obtained.

REFERENCE SIGNS LIST

1, 31 Optical connector ferrule
2a, 32a First end surface
2b Second end surface
2c, 2d Side surface
2e Upper surface
2f Lower surface
2g Window hole
2h Inlet port
2j, 32j Optical fiber holding hole
2k, 2m Guide hole
2n Gate mark
2p Flange portion
2q Step
2r, 32r Large diameter portion
2s, 32s Small diameter portion
2t, 32t Step portion
10, 40 Mold
12 Lower mold
12a Bottom surface
13 Middle mold
14 Cavity
15 Guide hole forming pin
16, 46 Optical fiber hole forming pin
16a, 46a First portion
16b, 46b Second portion
16c Step portion 17a, 17b Holding member
18a Upper holding member
18b Lower holding member
19 Cavity support
19a Insertion hole
19b C-shaped groove
20 Gate
21, 21A Catcher plate
21a, 21b Through hole
21c, 21d Split member
21e First V-shaped groove
21f Second V-shaped groove
D1 First direction
D2 Second direction
D3 Third direction
K Distance
L1 Reference line
N1 Length
P1, P2 Position

The invention claimed is:

1. A method for manufacturing an optical connector ferrule made of resin, the method comprising introducing resin into a cavity of a mold, the cavity taking a shape of the optical connector ferrule, and hardening the resin to form the optical connector ferrule, wherein
the optical connector ferrule includes
a first end surface and a second end surface facing each other in a first direction,
a pair of side surfaces facing each other in a second direction intersecting the first direction,
an upper surface and a lower surface facing each other in a third direction intersecting both the first direction and the second direction,
an inlet port formed on the second end surface, the inlet port being configured to collectively introduce a plurality of optical fibers along the first direction,
a window hole communicating from the upper surface to the inlet port,
a plurality of optical fiber holding holes extending through from the inlet port to the first end surface along the first direction and arranged side by side along the second direction, each of the plurality of optical fiber holding holes having a small diameter portion located adjacent to the first end surface and a large diameter portion located adjacent to the second end surface and larger in diameter than the small diameter portion, each of the plurality of optical fiber holding holes being configured to hold a corresponding one of the plurality of optical fibers, and
a plurality of fiber grooves each extending from a corresponding one of a plurality of the large diameter portions along the first direction and facing an opening of the window hole along the third direction,
at least one of a plurality of mold pins configured to form the plurality of optical fiber holding holes is different from the other mold pins in position, in the first direction, of a step portion located at a boundary between a first portion configured to form the small diameter portion and a second portion configured to form the large diameter portion, and
a position in the third direction of an optical fiber holding hole of the plurality of optical fiber holding holes formed by the at least one of the plurality of mold pins is adjusted owing to a configuration in which, in the plurality of mold pins, the step portion of the at least one of the plurality of mold pins is different in position from the step portions of the other mold pins.

2. The method for manufacturing an optical connector ferrule according to claim 1, wherein
the mold includes a gate located adjacent to the second end surface in the first direction relative to the window hole, the gate being configured to introduce the resin into the cavity.

3. The method for manufacturing an optical connector ferrule according to claim 1, wherein
the first portions of the mold pins become longer and longer from both ends in the second direction toward a center.

4. The method for manufacturing an optical connector ferrule according to claim 1, wherein
the first portions of the mold pins become shorter and shorter from both ends in the second direction toward a center.

5. The method for manufacturing an optical connector ferrule according to claim 1, wherein
a diameter of the first portions of the mold pins is in a range of from 80 μm to 128 μm, both inclusive.

6. The method for manufacturing an optical connector ferrule according to claim 1, wherein
a diameter of the second portions of the mold pins is in a range of from 100 μm to 250 μm, both inclusive.

* * * * *